UNITED STATES PATENT OFFICE.

MAX SCHILLER, OF NEW YORK, N. Y.

METHOD OF REFINING AND PURIFYING HYDROCARBON OILS.

SPECIFICATION forming part of Letters Patent No. 580,652, dated April 13, 1897.

Application filed February 5, 1896. Serial No. 578,144. (No specimens.)

*To all whom it may concern:*

Be it known that I, MAX SCHILLER, a resident of New York city, State of New York, (a Roumanian by birth, and formerly a subject of the Emperor of Austria-Hungary, but having declared my intention of becoming a citizen of the United States,) have invented a new and useful Improvement in the Method of Refining and Purifying Hydrocarbon Oils, of which the following is a specification.

Many of the crude petroleum-oils and other hydrocarbon oils, particularly those found in Canada and near Lima, Ohio, contain certain sulfur compounds. As the boiling-temperatures of those sulfur compounds lie within the limits of temperature under which the distillation of petroleum is ordinarily practiced these sulfur compounds are not eliminated by distillation, but, on the contrary, usually pass over with the distillate and are not destroyed nor decomposed by the distilling operation.

The objects of my invention are to produce by distillation a petroleum or other oil which is free from pungent and disagreeable odors and which is free from all sulfur compounds, and also to produce by direct distillation of crude oil an unusually large proportion of those distillates called "cracked oils," and thus to increase the proportion of burning oils obtained from the crude petroleum as well as to purify them of sulfur compounds.

According to my invention the oil is subjected during the distilling operation to the action of hydrogen in the nascent state. The hydrogen in this state and applied during the distilling operation breaks up all, even the most refractory, of the sulfur compounds, and combining with the sulfur produces sulfureted hydrogen.

My invention also includes the decomposition of the sulfureted hydrogen and formation of non-gaseous compounds therefrom, whereby offensive and otherwise objectionable odors are prevented.

According to my invention I use as a source of hydrogen zinc-dust in conjunction with an alkaline hydrate, as caustic soda or potash, and the alkaline hydrate is employed in a dry or substantially dry condition and may be powdered or otherwise finely comminuted and with the zinc-dust is added to the oil while the oil is in a liquid condition, and the mixture is then heated up to the desired vaporizing temperature and the distillation properly and usually conducted and the vapors of oil condensed in the usual way.

The first chemical reaction resulting from the zinc-dust and alkaline hydrate and the application of the vaporizing heat will be the formation of a new compound, a zincate of soda or potash, as the case may be, and the separation of the hydrogen, which in the nascent condition is thus liberated in the presence of the vaporizing or vaporized hydrocarbon. This reaction is represented in the following formula, caustic soda being selected as the particular alkali for illustration:

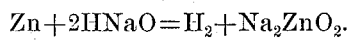
$$Zn + 2HNaO = H_2 + Na_2ZnO_2.$$

The next reaction will be the combination of the nascent hydrogen with the sulfur compounds to form sulfureted hydrogen, ($H_2S$,) whereby the objectionable sulfur compounds will be broken up, and substantially the only sulfur compound present will be the sulfureted hydrogen.

In practically carrying out my improved process I sometimes employ about five per centum more than that quantity of zinc-dust and alkaline hydrate which is necessary to develop the required amount of hydrogen for combining with the sulfur present to form sulfureted hydrogen. The proportion of sulfur in the crude oil is usually from one-half to two per centum. The proportions of the reagents will of course be varied in accordance with the amount of sulfur in the oil, but will be readily determinable in any case from the atomic weights in connection with the formulas herein given.

The following is an example of proportions used where the oil contains about two per centum of sulfur: oil and sulfur present, one hundred; proportion of sulfur present, two; zinc added, 4.2; sodium hydrate, 5.26.

The excess of zinc and sodium hydrate may be varied in some cases from the five per centum excess in the above-stated proportions.

The next reaction is the decomposition of the sulfureted hydrogen and the formation of non-gaseous compounds therefrom, this reaction producing sulfid of zinc and the original alkaline hydrate according to the following formula:

$$Na_2ZnO_2 + H_2S = ZnS + 2HNaO.$$

Thus I also avoid the offensive odor which would result if the sulfureted hydrogen passed over with the distillate, as that sulfureted hydrogen would eventually reach the outer air.

For removing the adherent traces of alkali and of sulfureted hydrogen the distillate may be treated with sulfuric acid, washed with water, and neutralized as commonly. This will cause the oil to be left pure of sulfur and free of any odor.

I may apply my improved method to the burning oil obtained by distilling the crude oil in the ordinary way, but in many cases it may be better to treat the crude oil for many reasons. One reason for the preference is that I save a redistillation, another that I am enabled by applying a small excess of zinc-dust and alkaline hydrate to produce those distillates which are called "cracked oils," and thereby to increase the proportion of burning oils obtained from the crude petroleum. It seems as if the hydrogen decomposes or breaks up those hydrocarbon compounds whose boiling-temperature lies in the higher limits and changes them to compounds having lower boiling-points. Besides these advantages I may further reduce the cost of production by revivifying the zinc, so that it may be again used in my purifying process. When the temperature is reached where only heavy oil remains, the still is cooled down, the liquid portion of the residuum is drawn off, and the remainder taken out and washed out with light distillates by decantation.

By employing the usual metallurgical operations, as roasting or oxidation and reduction, the zinc will be recovered according to the following formulas:

$$ZnS + O_3 = ZnO + SO_2.$$
$$ZnO + C = Zn + CO.$$

It is not essential to the invention, but the mixture of oils with the chemicals may be secured by a mechanical stirrer, but the hydrogen gas serves itself as a stirrer and may in some cases be sufficient for that purpose.

I am aware that gases, such as carbonic acid, carbonic oxid, light carbureted hydrogen, nitrogen, and hydrogen, have been used in connection with petroleum-oils, but merely in a mechanical way, as agitating or stirring means and without chemical action. There have also been processes to eliminate sulfur from petroleum-oil by treating the same before the distillation with gases rich in hydrogen in a heated condition, such as steam, whereby the sulfur in the oil will unite with the hydrogen of the gas. These processes are only partially effective, as the hydrogen is not present in nascent conditions and the sulfur compounds are decomposed only to a limited extent. These processes are also open to the objection that the sulfureted hydrogen produced escapes into the air, causing a disagreeable and poisonous odor.

It has also been proposed to treat fluid oils as fats with hydrogen generated by the ordinary action of zinc and sulfuric acid, but in these processes the hydrogen has not been employed in nascent condition nor during the distilling operation, and the escape of the sulfureted hydrogen into the air has been highly objectionable.

It has also been proposed to prepare liquid hydrocarbons for use in carbureting other gases by digesting them with aqueous or alcoholic potash or soda-lye under the addition of zinc-dust, but the action of aqueous or alcoholic solutions of potash or soda is materially different from that of the substantially dry alkaline hydrate introduced directly into the liquid hydrocarbon in the carrying out of my process, and would not measurably accomplish the results attained by my process.

What I claim, and desire to secure by Letters Patent, is—

1. The process of removing sulfur compounds from hydrocarbon oils which consists in distilling said oils with zinc-dust and an alkaline hydrate present in the oil itself, substantially as set forth.

2. The process of removing sulfur compounds from hydrocarbon oils which consists in mixing the crude oil with zinc-dust and substantially dry alkaline hydrate for the production of hydrogen to combine with the sulfur of said sulfur compounds, the proportion of zinc-dust and alkaline hydrate being in excess of that required for the separation of hydrogen to combine with the sulfur compounds, and subjecting the same to the distilling operation, substantially as set forth.

This specification signed and witnessed this 4th day of February, 1896.

MAX SCHILLER.

In presence of—
HENRY D. WILLIAMS,
HERBERT H. GIBBS.